Figure 6:
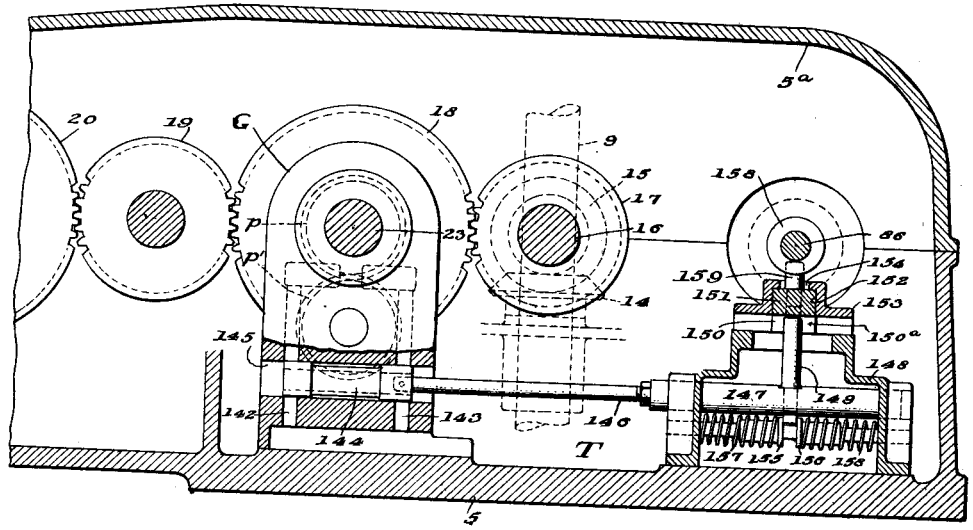

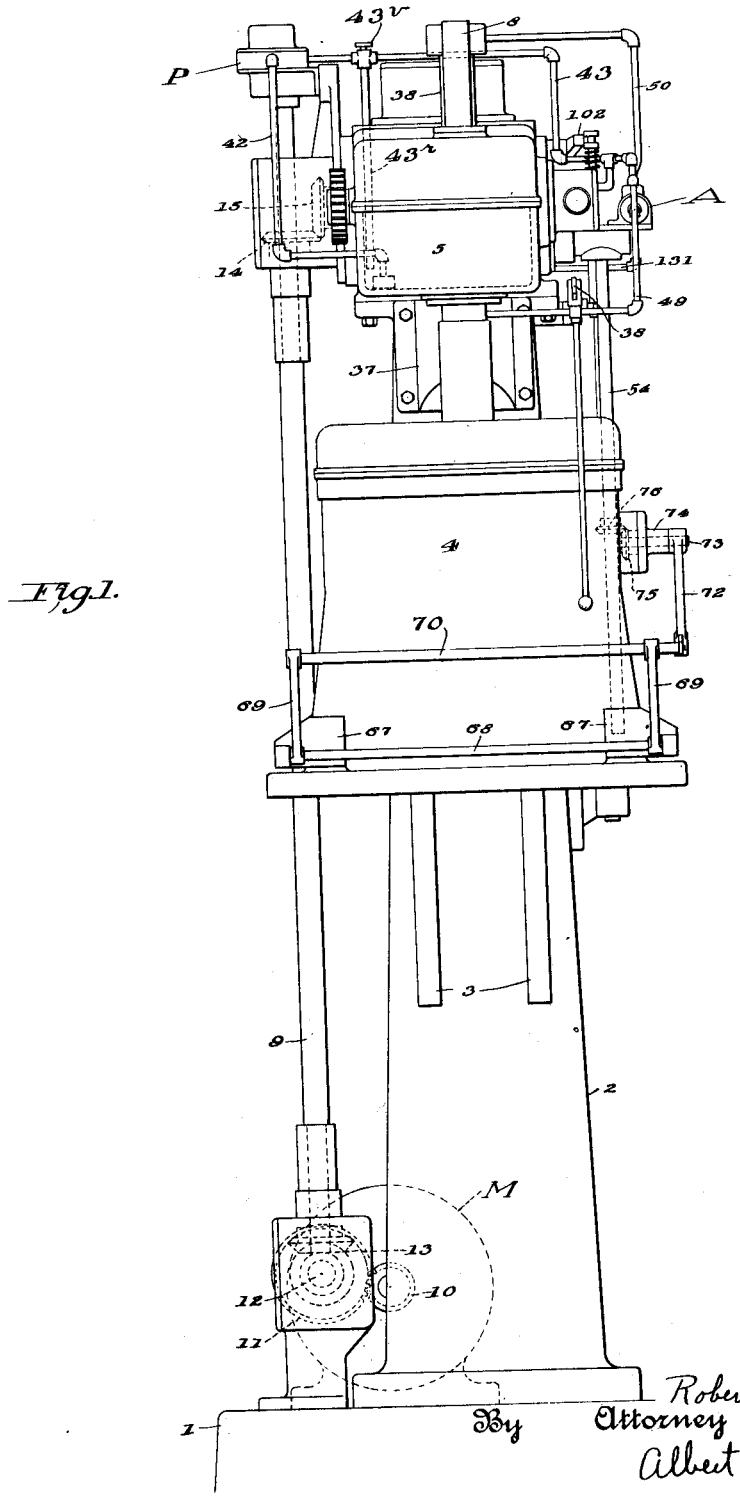

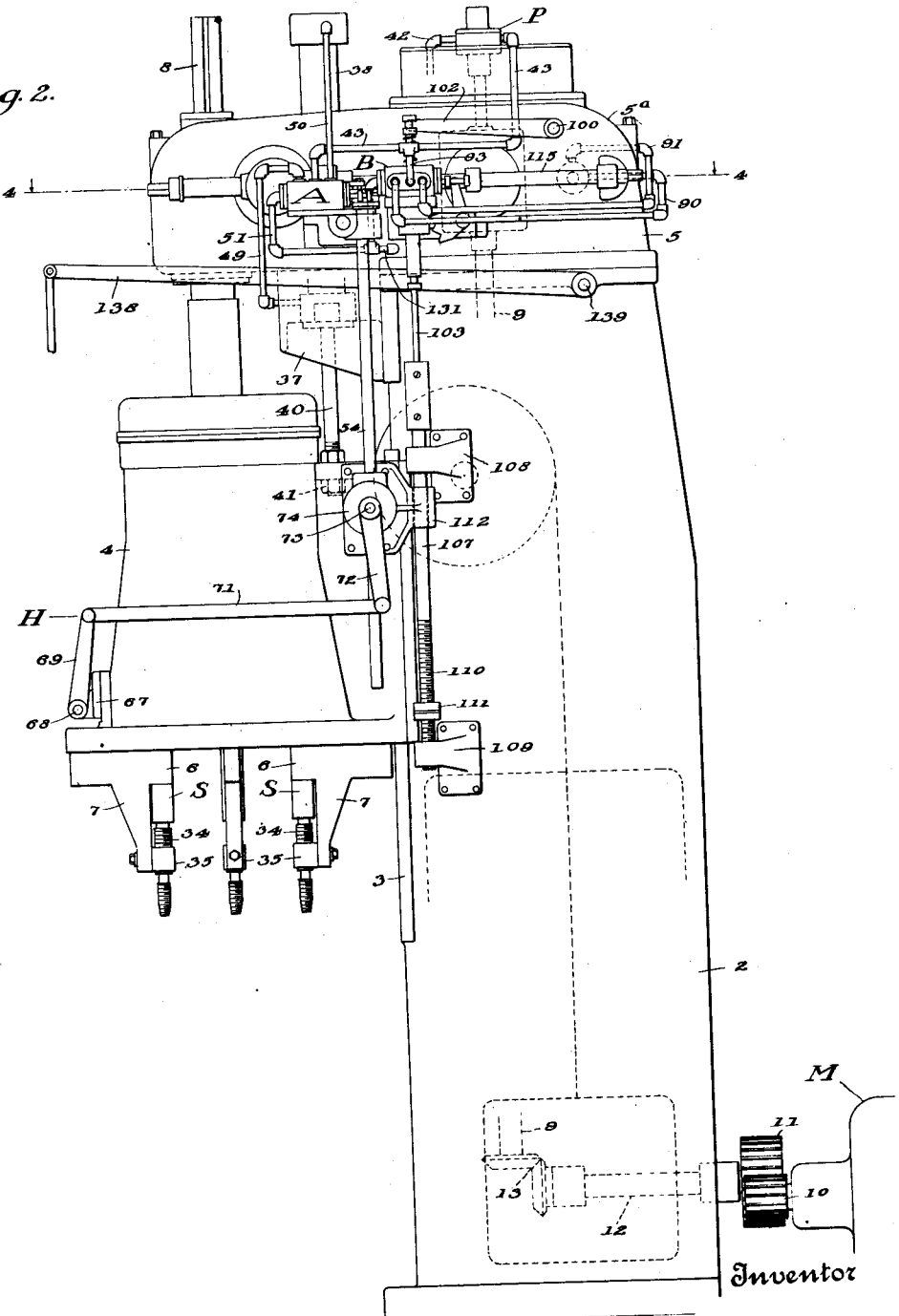

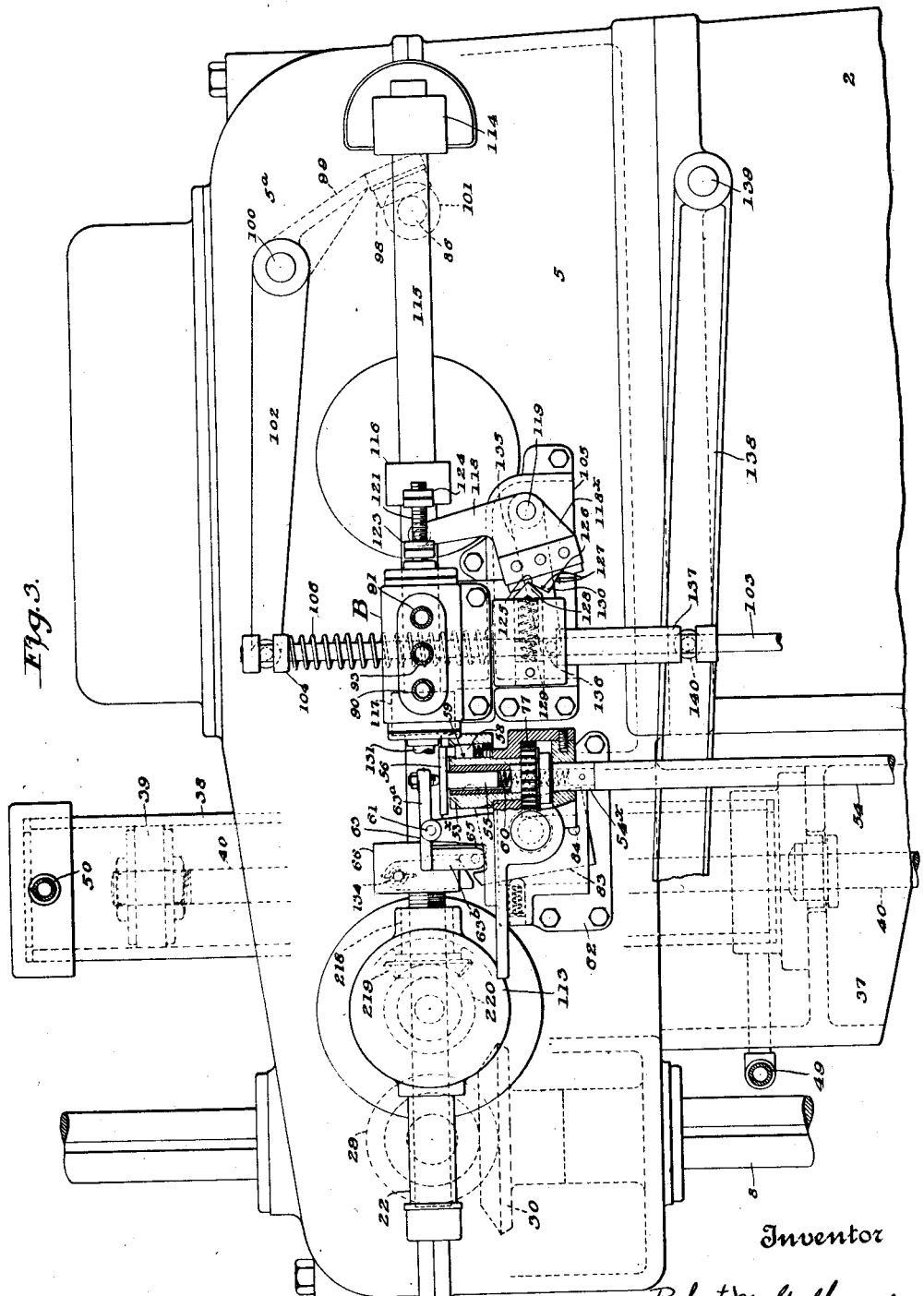

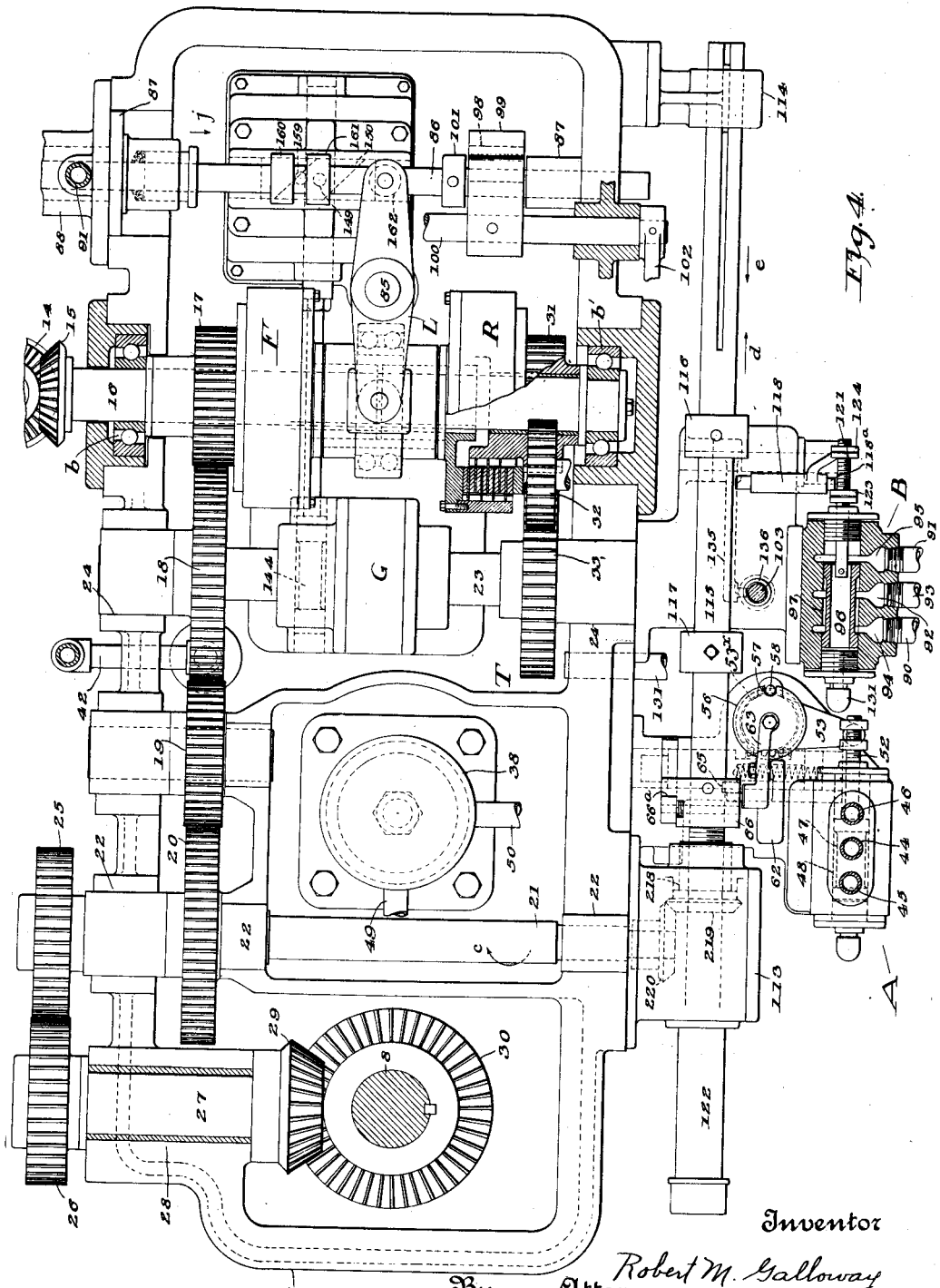

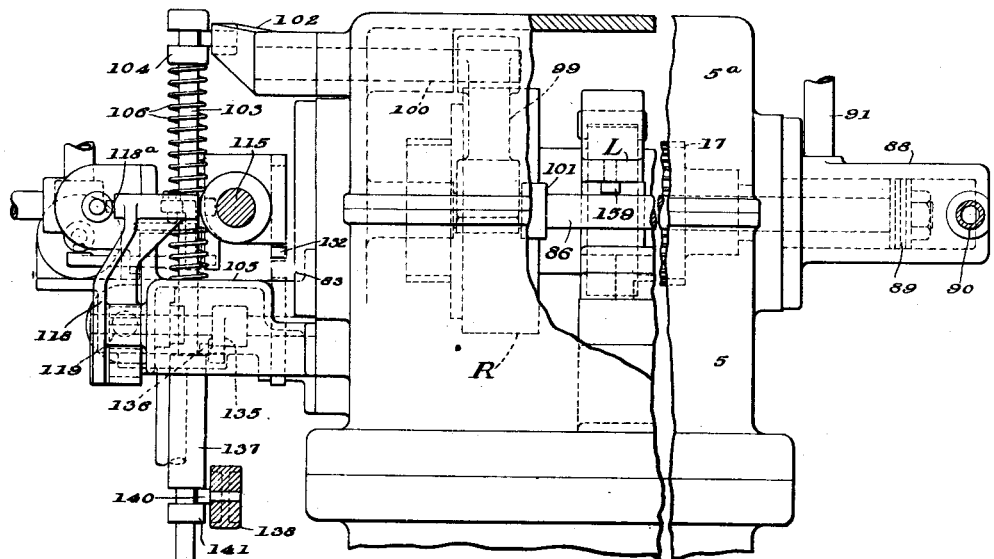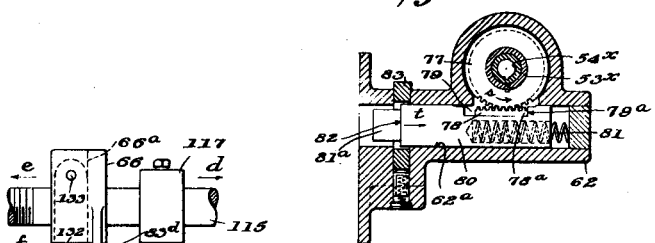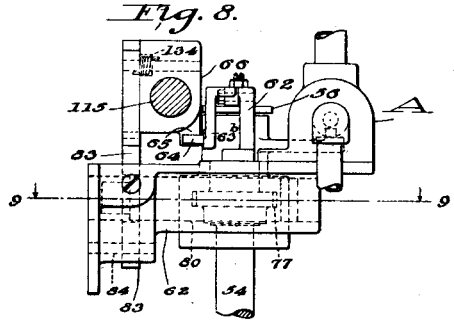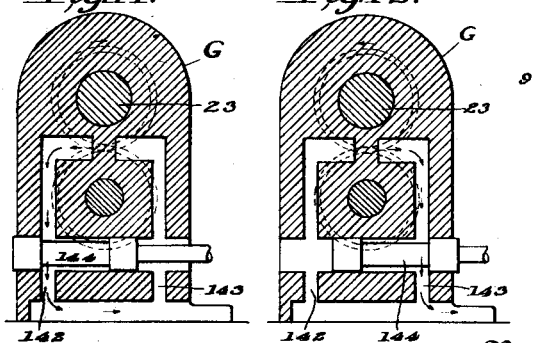

Patented Feb. 11, 1930

1,747,111

UNITED STATES PATENT OFFICE

ROBERT M. GALLOWAY, OF RICHMOND, INDIANA, ASSIGNOR TO THE NATIONAL AUTOMATIC TOOL COMPANY, OF RICHMOND, INDIANA, A CORPORATION OF INDIANA

HYDRAULIC AUTOMATIC MULTIPLE TAPPING MACHINE

Application filed April 29, 1926. Serial No. 105,501.

Certain types of machines include elements which, in the operation of the machines, necessarily must be translated, first to bring the tools into contact with the work, second to give the tools a cutting feed into the work and then reversed to separate the tools and the work to permit removal of the work from the machine, etc. Also in certain types of machine tools, such for example as drilling and tapping machines, the tools must be given a rotary motion during their cutting feed. It will readily be perceived that inasmuch as there is no working operation effected during the movement of the tools to and from the work this movement may be at a relatively rapid rate thereby greatly reducing the time required to effect such movements and consequently effecting a proportionate increase in production.

Heretofore it has been customary to provide mechanical power transmissions to effect these movements of the tools and, to enable the tools to be moved selectively at slow and rapid rates, separate transmissions frequently have been employed. None of these mechanical transmissions have, however, been entirely satisfactory in that they are all complicated in construction, they all produce vibration, are more or less noisy, and do not lend themselves readily to sudden changes in speed and direction of motion.

This invention has for an object to provide a transmission well adapted to effect the necessary movements of the tools (or other translatable members) and which will be devoid of the inherent defects and undesirable features of prior transmissions. This has been attained by the provision of a hydraulic transmission for giving the tools their rapid traverse to and from the work, a screw feed actuated by the rotation of the tools for feeding the tools into the work and automatic means controlled by the movement of the tool-carrying member for actuating said hydraulic transmission.

In the operation of drilling and tapping machines it is desirable that rotation of the tools be discontinued when the tools have been withdrawn from the work and that they remain at rest until they are about to contact with the work in a subsequent operation. Another object of the present invention is to provide improved means whereby this starting and stopping of rotation of the tool spindles may be effected without the use of complicated mechanism and without noise, shock, or vibration. This has been attained by the use of a fluid actuated clutch embodied in the spindle rotating mechanism which clutch is operated in timed relation with the translation of the tool-head to start and stop rotation of the tools at the desired times.

In the use of a tapping machine it is frequently necessary that a hole be tapped to a predetermined depth. Heretofore difficulty has been experienced in this operation due to the fact that, although the power for rotating the taps could be discontinued at any desired time, momentum of the parts would sometimes give the taps one or more rotations after the power was discontinued, thereby causing the taps to continue into the work. This invention therefore has as one of its objectives the provision of means to bring the parts to rest instantaneously, and yet without shock or jar, upon discontinuance of the power whereby the depth of the tapped hole may be controlled to a nicety regardless of the nature of the work being operated on. To meet this desideratum this invention provides a hydraulic brake acting directly upon the tool-spindle rotating mechanism. This brake is controlled by a valve which in turn is actuated by the spindle driving mechanism so that the brake is maintained ineffective during either a forward or reverse drive but immediately upon discontinuing the drive the brake will become effective to bring the parts to rest.

Still another object of this invention is to provide an "all hydraulic" automatic machine tool, i. e. one in which all of the actuating mechanism is controlled by fluid pressure and in the operation of which it is only necessary for the operator to start the machine, the automatic mechanism thereafter serving to effect a complete cycle of operation and bring the parts to rest.

This invention is adaptable to various types of machines and for convenience it will be illustrated and described as embodied in a multiple spindle tapping machine for giving the tap spindles rotary and translatory movements. It is to be understood, however, that this is merely one of many adaptations of the invention that its various other uses are contemplated and are intended to be covered herein.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 5:
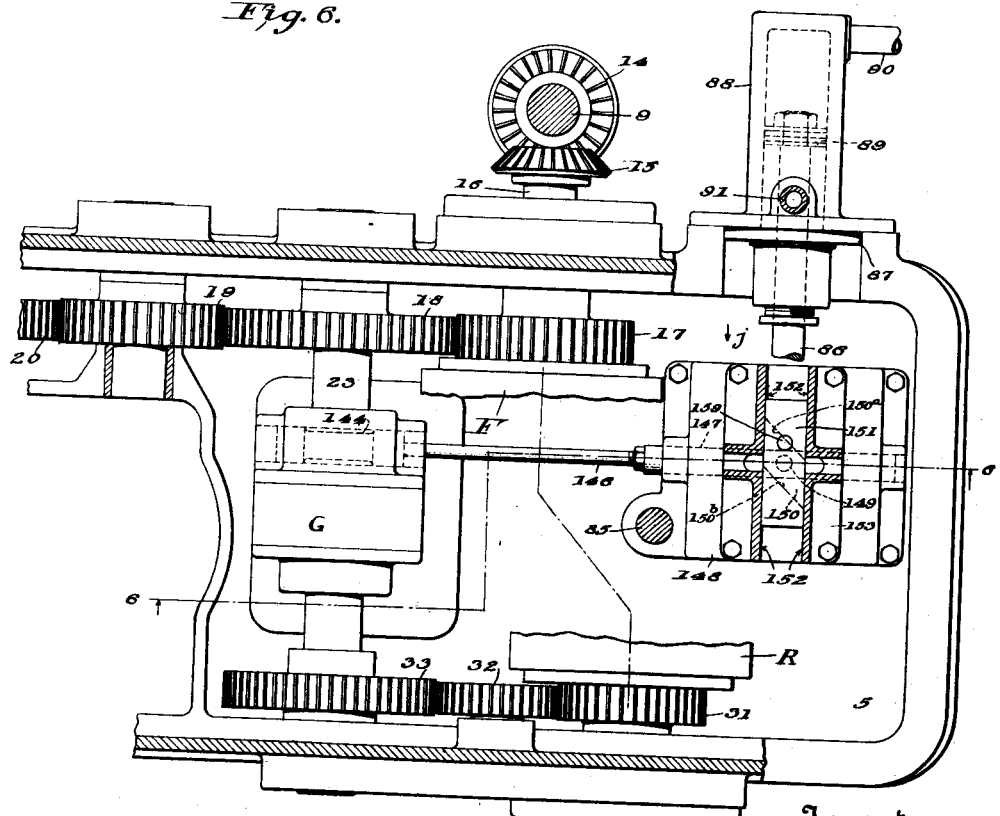

Figure 1 is a front elevation of a tapping machine embodying the present invention. Fig. 2 is a right side elevation thereof. Fig. 3 is an enlarged view, partly in section, of the upper portion of Fig. 2, certain parts being omitted for the sake of clearness. Fig. 4 is an enlarged view substantially on the line 4—4 of Fig. 2. Fig. 5 is a horizontal section showing more particularly the hydraulic brake and its actuating mechanism hereinbefore referred to. Fig. 6 is a vertical section on the line 6—6 of Fig. 5. Fig. 7 is a rear view, partly in section, of the upper portion of machine shown in Fig. 2. Fig. 8 is a detail front elevation of a load-and-fire valve-actuating device, later to be described. Fig. 9 is a section on the line 9—9 of Fig. 8. Fig. 10 is a detail view of a trip mechanism later to be described. Figs. 11 and 12 are diagrammatic views showing the ineffective positions of the brake controlling valve in tap forward and reverse drives, respectively.

Referring more specifically to the drawings, the invention is disclosed as embodied in a multiple spindle tapping machine combining a base 1, a column 2 arising from the base and provided at its front face with spaced ways 3, a tool head 4 translatably mounted on said ways, and a gear box 5 secured upon the upper end of the column and carrying spindle-actuating mechanism later to be described. Within bearings 6, carried by arms 7 adjustably secured to the tool head 4, are rotatably journaled a plurality of tool-spindles S adapted to be rotated from a power driven shaft 8 entering the tool-head from the top. Inasmuch as the specific means for rotating the spindles from the shaft 8 is conventional and forms no part of this invention, illustration and description thereof is deemed unnecessary. The spindle supporting arms 7 are universally adjustable on the tool-head and therefore any desired arrangement of spindles may be secured.

Although Fig. 2 shows only three spindles carried by the tool-head it is to be understood that this is merely illustrative and that in practice a materially greater number may be employed.

Power to rotate the spindles and to effect translation of the tool-head on the column is preferably provided by a motor or other prime-mover M located at the base of the column. Power is transmitted from the prime-mover to a shaft 9, journaled lengthwise of the column, by any suitable means, such, for example, as that shown in Figs. 1 and 2 and comprising a driving pinion 10 on the motor shaft, a driven gear 11 on a horizontally disposed shaft 12 and a bevel gear connection 13 between the shafts 9 and 12. Intermediate the ends of the shaft 9, but adjacent the upper end thereof, there is secured a bevel gear 14 which meshes with and drives a similar gear 15 fixed upon a shaft 16 journaled in bearings $b$ and $b'$ supported by the gear-box 5.

Spindle forward drive

Loosely journaled on the shaft 16 is a gear 17 which is adapted, at certain times, to be secured to said shaft by a forward drive friction clutch F actuated by a clutch-shifting lever L, later to be referred to. When the clutch F is effective the gear 17 acts as the driver for a gear train comprising gears 18, 19 and 20 of which the latter is secured upon a horizontally disposed shaft 21 journaled in bearings 22 provided by the gear-box. Likewise, the gear 18 is secured upon a horizontally disposed shaft 23 journaled in bearings 24 provided by the gear-box. To the shaft 21 is secured a gear 25 which drives a similar gear 26 fixed upon a short shaft 27 journaled in a bearing 28 also provided by the gear-box. This shaft 27 carries a bevel pinion 29 which drives a bevel gear 30 splined to the spindle driving shaft 8. Thus by actuating the clutch F the tool spindles S will be rotated forwardly, or in other words, in a direction to cause the taps to enter the work.

Spindle reverse drive

A friction clutch R, similar in construction to the clutch F, also is carried by the shaft 16 and is actuated by the lever L. One portion of the clutch R carries a gear 31 which drives an idler gear 32 in mesh with a gear 33, fixed upon the shaft 23 hereinbefore referred to, and serves to drive the shaft 23 and gear 18 in a direction reverse to the direction in which they are driven by the gear 17 when the clutch F is effective. This reverse drive is transmitted to the spindles, and to the taps carried thereby, by the gearing hereinbefore described and serves to unscrew the taps from the work when the holes have been tapped to the desired depth.

Tap in-feed

Feed of the taps into the work is effected during the forward rotation of the taps by means of lead-screws 34 which have threaded connections with stationary lead-nuts 35 secured to the arm 7 supported by the tool-head. A tap is secured in the lower end of each of said lead-screws and the upper ends of said screws have a splined connection with the spindles, whereby rotation of the lead-screws in the stationary lead-nuts causes the screws, and taps carried thereby, to be moved axially independently of the spindles.

Hydraulic rapid traverse

As hereinbefore explained, the movement of the tool-head, to bring the taps into contact with the work and to remove them therefrom after the tapping is completed, and the taps have been unscrewed from the work, may be at a relatively rapid rate inasmuch as no machining operation is then being effected. One of the important features of this invention is the provision of hydraulic means to effect this rapid traverse of the tool-head and automatic means to control its actuation. To this end there is supported, above the tool head, by means of its attachment to a bracket 37 secured to the standard 2, a cylinder 38 within which is fitted a piston 39, secured upon one end of a rod 40 which has its other end attached to the tool head, as shown at 41 in Fig. 2.

Fluid pressure, to move the piston in the cylinder, is provided by a pump P, (which may be of the gear type) connected to the upper end of the shaft 9 and actuated by its rotary motion. This pump has an intake pipe 42 connected with a sump T, formed in the gear case 5, and an exhaust pipe, or pressure line 43, which is connected with control valves A and B. These valves may be of any desired or suitable form such, for example, as the sliding piston type shown, and each has a single intake port and two exhaust ports. The intake port 44 of the valve A is connected with the fluid pressure line 43 and fluid (preferably oil) entering that port is alternately exhausted through ports 45 and 46 which are alternately connected with, and isolated from, the intake port by a sliding piston 47 slidable in a bore 48 in the valve casing and having the portion intermediate its ends of reduced diameter. The port 45 is connected by a pipe 49, with the cylinder 38 beneath the piston 39 whereby fluid exhausted through the port 45 will enter the cylinder and cause the piston to be forced upwardly carrying with it the rod 40 and tool-head 4. The port 46 is likewise connected with the cylinder 38 by a pipe 50, but this pipe enters the cylinder above the piston and fluid flowing therethrough causes the piston and tool-head to be forced downwardly. The valve A is also provided at one end with a drain port which is connected by a pipe 51 with a drain 131 leading to the sump, thus when the piston is in a position to effect a flow of fluid into the upper end of the cylinder the fluid beneath the piston may be expelled through the pipe 45, valve A, and pipe 51 back into the sump. Likewise flow of fluid into the lower end of the cylinder causes the pipe 46 to act as an exhaust, the piston 47 being formed with an axial bore to permit flow of fluid from the pipe 46, through the valve to the return pipe 51.

The pump P, by means of its connection with the rotating shaft 9, is actuated continuously and, inasmuch as the flow of fluid through the pipe 43 is not utilized at all times during the operation of the machine tool, unless some provision was made to receive the out-put of the pump excessive and destructive pressure would be built up in the line 43. To alleviate this pressure a relief line 43$^r$ (see Fig. 1) controlled by a relief valve 43$^v$, which opens under a predetermined pressure, is interposed between the pump and the valves A and B and serves, at certain times, to conduct the fluid exhausted by the pump back to the reservoir T.

The piston 47 is connected to a rod 52 and is shifted axially in the bore 48 by an arm 53 connected with the rod 52 and having its hub 53$^x$ loosely journaled on a tubular extension 54$^x$ of a vertically disposed shaft 54 to which it is adapted to be clutched for manual movement as will hereinafter be explained. The arm 53 and valve piston 47 also may be shifted automatically by a load-and-fire mechanism after the tapping has been completed and the taps have been unscrewed from the work to give to the tool-head a rapid upward traverse. To enable the arm 53 to be clutched to the shaft 54 there is splined within the tube 54$^x$ a pin 55 having a disk-like head 56, formed with a notch 57. When the arm 53 and piston 47 are in position to effect upward movement of the head the notch 57 is vertically aligned with a spring pressed plunger 58 held within a bore 59 in the hub of the lever 53. The pin 55 and disk 56 are forced upwardly by a spring 60 located within the tubular portion 54$^x$ so that the disk normally lies in a plane above the upper end of the plunger 58 and the notch may pass over the plunger without being engaged thereby. Fulcrumed at 61 upon a bracket 62 secured to the gear box 5 is a bell-crank lever 63 of which one arm 63$^a$ overlies the disk 56. The other arm 63$^b$ of the bell-crank lever carries a laterally projecting pin 64 which, at a predetermined time, is engaged by a shoulder 65 provided by a movable dog 66 later to be referred to. This causes the lever 63 to be swung clockwise about its fulcrum, as viewed in Fig. 3, thereby forcing downwardly on the disk 56 to permit the plunger to enter the notch 57. The shaft 54 is adapted to be oscillated manually to shift the valve piston 48 and this is preferably effected by means now to be described. Rotatably journaled in bearing brackets 67 secured to the tool-head is a rod 68 which carries two upstanding arms 69 having their upper ends connected to a cross bar 70. These members constitute what will hereinafter be termed a starting lever H for the machine tool. This lever is connected, by a link 71, to an arm 72 fixed to a rock-shaft 73 journaled in a bearing bracket 74 secured to the tool-head. A bevel gear 75 on the shaft 73 meshes with a similar gear 76 splined to the shaft 54. From the foregoing it will be perceived that an anti-clockwise movement of the starting lever, as viewed in Fig. 2, will effect anti-clockwise movement of the lever 53, as viewed in plan, which will cause the piston of the valve A to be shifted to a position to effect upward movement of the tool-head. This movement of the lever 53 likewise effects rotation of a gear 77, fixed to the hub 53$^x$ thereof, which meshes with a rack 78 slidingly fitted within a recess 79 in a spring-pressed plunger 80 fitted within a bore 62$^a$ of the bracket 62 (see Fig. 9). Movement of the rack 78 in the direction indicated by the arrow $s$ causes its end 78$^a$ to contact with the end wall 79$^a$ of said recess, whereby anti-clockwise rotation of the gear 77 and the consequent rectilinear movement of the rack causes the plunger 80 to be moved in the direction of the arrow $t$ in opposition to a spring 81. The plunger is formed at one end with a reduced portion 81$^a$ which affords an annular shoulder 82. A spring pressed latch member 83, pivoted at 84 to the bracket 62, has an orifice 83$^a$ through which projects the reduced end 81$^a$, and provides a wall 83$^b$ arranged to bear against the periphery of the plunger and to snap in front of the shoulder 82 when the plunger is retracted in opposition to the spring 81, thereby to maintain the plunger under spring pressure for subsequent release as will hereinafter be explained.

The lost motion between the rack 78 and the recess 79 permits the shaft 54 and gear 77 manually to be rotated clockwise, thereby to shift the valve piston 47 from a rapid down traverse position to a rapid up traverse position should the operator, after the starting lever has been shifted and during the time prior to starting of the taps into the work, desire to discontinue the operation of the machine. At this time the latch 83 will be holding the plunger 80 depressed.

*Tap rotation control mechanism*

The time in the cycle of operation at which forward and reverse rotation of the taps is begun is controlled automatically as will now be described. The clutch actuating lever L, hereinbefore referred to, is fulcrumed upon a stud 85 and has one end operatively connected by means of a lost-motion connection to a slide rod 86 translatably journaled in bearings 87 provided by the gear-box 5. One end of the rod 86 enters a cylinder 88, secured to the gear-box, and carries a piston 89 movable in said cylinder. Two fluid pressure pipes 90 and 91 are connected with said cylinder at opposite sides of the piston and fluid flowing into the cylinder alternately through said pipes serve to move the piston back and forth therein which, through the rod 86 and lever L, alternately actuates the clutches F and R. The flow of fluid into the cylinder 88 is controlled by a valve B (similar in construction to the hydraulic traverse controlling valve A) having an intake port 92, connected by a pipe 93 to the fluid pressure line 43, and outlet ports 94 and 95 connected with the pipes 90 and 91, respectively, entering the cylinder 88. A cylindrical piston 96, slidably mounted in a bore 97 in the casing of the valve B, alternately effects communication between the intake port 92 and the exhaust ports 94 and 95. The valve B is so regulated and controlled that when the tool-head comes to rest, in its uppermost position, the pipe 90 is connected with the pipe 93 whereby pressure is maintained in the outer end of cylinder thereby tending to shift the rod 86 inwardly and lever L clockwise, as viewed in plan, which would actuate the clutch F and again rotate the spindles in a forward direction. This movement of the rod and lever however is prevented by an interference block 98 secured upon an arm 99 fixed to rock-shaft 100 journaled in the cap 5$^a$ of the gear-box 5. When the lever L is shifted to effect a reverse rotation of the taps, to unscrew them from the work, the interference block 98 drops behind a collar 101 fixed to the shaft 86 and prevents the lever from again being swung to effect a forward rotation of the taps until said block has been removed as will later be explained. To the shaft 100 there is secured, exteriorly of the cap 5$^a$, a lever 102 which has its free end connected with a vertically disposed slide-rod 103 normally forced upwardly by a coil spring 106 interposed between a collar 104 on said rod and a bracket 105 secured to the side of the gear box. The action of this spring on the lever 102 tends to maintain the interference block 98 in the path of the collar 101. The rod 103 is connected to another rod 107, slidingly mounted in bearing brackets 108 and 109 fixed to the column 2, and having a threaded portion 110 upon which is adjustably mounted a nut 111. The bearing bracket 74, carried by the tool-head, is formed with a lug 112 bored to slidingly fit upon the rod 107.

As the tool-head descends, and just prior to contact of the tools with the work, the lug 112 engages the nut 111 and pulls downwardly on the rods 107 and 103 against the action of the spring 106 until the nut 111 contacts with the bracket 109, which is of sufficient strength to withstand the downward pressure on the piston 39, thus bringing the tool-head to rest. This downward movement of the rods 107 and 103 swings the lever 102 and arm 99 counter-clockwise, as viewed in Figs. 2 and 3, thereby lifting the interference block 98 out of the path of the collar 101 and permitting the rod 86 to move under the influence of the fluid pressure in the outer end of the cylinder 88, shifting the clutch actuating lever L and rendering effective the forward drive friction-clutch F.

Translatably but non-rotatably mounted in brackets 113 and 114 secured to the gear box 5 is a control-bar 115 to which is permanently secured a trip-dog 116 adapted, at a predetermined point in the cycle of operation, to shift a lever 118, fixed to a rock-shaft 119, and operatively connected with a rod 121 attached to the valve-piston 96, whereby the valve A effects a forward tap drive. The tool-head is now at rest in its lowermost position; the taps are in contact with the work and are being rotated forwardly, and this rotation, by the action of the lead nuts 35, causes the taps to be threaded into the work. The depth to which the taps may enter the work is controlled automatically by means now to be described. A second trip-dog 117 is adjustably mounted on the control bar 115 and acts, at a predetermined time, to shift the valve piston 96 to stop forward rotation of the taps thereby regulating the depth of the tapped holes, and giving the taps reverse rotation to unscrew them from the work. Translation of the control bar 115 is effected by a nut 218 threaded thereon and rotatably but non-translatably journaled in the bracket 113. This nut is fixed to a bevel gear 219 permanently in mesh with a similar gear 220 secured to the shaft 21 forming a part of the tap rotating mechanism. During forward rotation of the taps the shaft 21 and gears 220 and 219 are rotated in the direction of the arrows $c$ thereby shifting the bar 115, and the trip dogs carried thereby to the right or in the direction of the arrow $d$ Fig. 4. This movement continues until the dog 117 shifts the lever 118 and the valve piston 96 to effect communication between the ports 92 and 95, thereby reversing the direction of rotation of the spindle driving mechanism, gears 220, 219, nut 218 and causing the bar to be translated in the direction indicated by the arrow $e$. This reverse movement causes the dog 116 to shift the valve to forward drive position as hereinbefore explained, in which positions the parts are brought to rest. A closed tube 122 secured in the bracket 113 serves as a guard for the forwardly projecting end of the control-bar 115.

To insure that the piston 96 will occupy one or the other of its two operative positions, the valve shifting lever 118 is formed as part of a load-and-fire mechanism which temporarily defers shifting of the valve until a sufficient pressure has been built up rapidly to shift the piston. The lever 118 therefore has a lost-motion connection with the rod 121 so that the lever may have a partial movement without affecting the valve. This is effected by having the lever carry a stud $118^a$ which has free play between nuts 123 and 124 secured to the valve actuating bar 121. The arm $118^x$ of the lever 118 is formed with notches 125 and 126 each providing a cam wall 127 adapted to act upon a spring-pressed plunger 128. Movement of the lever about its fulcrum will cause one of the cam walls 127 to depress the plunger 128 against the action of the spring 129 until the point of the plunger reaches the apex 130 between said notches. This movement shifts the stud $118^a$ through the space between the nuts 123 and 124 but does not shift the rod 121 and the valve piston connected thereto. Further movement of the lever 118 carries the apex 130 beyond the point of the plunger 128 and the spring 129 then forces the plunger down the other cam wall which causes the lever 118 to be given a substantial movement which shifts the valve piston 96 to its other operative position. Like the valve piston 47, the piston 96 is provided with a central bore which, during a flow of fluid into the cylinder 88 through the pipe 90, permits the opposite end of the cylinder to exhaust through pipe 91, thence through the bore in the piston 96 to a drain pipe 131 connected with the sump T.

As hereinbefore explained shifting of the valve-piston 47 causes the plunger to be depressed against the action of the spring 81 whereupon the latch member 83 is brought against the shoulder 82 to prevent the plunger from returning under the influence of said spring. This places the parts in the position shown in Fig. 10, whereupon movement of the control bar 115 in the direction of the arrow $d$, during forward rotation of the taps, brings the free end of a trip-finger 132, pivoted at 133 upon the dog 66, into contact with a lug $83^c$ formed on the latch 83. A coil spring 134 surrounding the pivot 133 normally holds the finger 132 in a vertical position with one edge thereof in contact with a wall $66^a$ of the dog 66 but permits it to be swung upwardly in the direction of the arrow $f$ so that it may wipe past the lug $83^c$ when moved in the direction indicated by the arrow $d$. Upon its return movement in the direction indicated by the arrow $e$ (which takes place during reverse rotation of the taps and while the tool-head is in its lowermost position) the finger 132 engages the wall $83^d$ of the lug $83^c$ thereby swinging the latch 83 about its pivot, in the direction indicated by the arrow g, thus moving the wall 83ᵇ out of the path of the plunger 80 thereby permitting it to move under the influence of the spring 81. This movement of the plunger 80 and rack 78 rotates the gear 77, and parts connected therewith, clockwise as viewed in plan and thus the arm 53 shifts the valve piston 47 to the left to connect the ports 44 and 46 to effect a rapid elevation of the tool-head. To prevent breakage of the taps and destruction of the work, provision is made so that after the taps have been started into the work the operator may not shift the valve piston 47 to effect upward movement of the tool head without first reversing the direction of rotation of the taps to unscrew them from the work. This is effected by means now to be described. As hereinbefore explained the manually operable shaft 54 is normally disconnected from the valve actuating lever 53 and is connected thereto only when the disk 56 is depressed by the lever 63 to bring its notch 57 into engagement with the pin 58 carried by said lever. As the tap forward drive begins the dog 66 moves with the control bar in the direction of the arrow d and as stated above this causes the shoulder 65 on said dog to move out of contact with the pin 64 carried by the arm 63ᵇ of the lever 63, with the result that the lever 63 is free to move counter-clockwise, as viewed in Fig. 3, under the influence of the spring 60 forcing upwardly on the pin 55 and disk 56, thereby disconnecting the disk and the plunger 58. A reverse rotation of the taps (which the operator may effect at any desired time) returns the dog 66 to the position shown in Fig. 3 which causes the shoulder 65 again to engage the pin 64 thereby swinging the lever 63 clockwise and depressing the disk so that the plunger 58 may snap into the notch 57 whereby the operator again may shift the valve piston manually to effect upward travel of the tool-head.

After the taps have started into the work should the operator, for any reason, wish to discontinue the operation (it is to be remembered that the connection between the shaft 54 and the lever 53 is now broken) he must first reverse the direction of rotation of the taps to bring the dog 66 back to the position where the shoulder 65 swings the lever 63 to depress the disk 56 into engagement with the plunger 58. To this end there is fixed to the rock shaft 119 (which also carries the actuating lever 118 for the valve B) an arm 135 having a laterally projecting stud 136 overlying the upper end of a sleeve 137 slidingly fitted upon the rod 103. A manually actuable lever 138, fulcrumed at 139 to the upper end of the column 2, carries a stud 140 engaging the lower end of the sleeve 137 whereby upward movement of the lever 138 effects clockwise rotation of the shaft 119 and of the lever 118 secured thereto (see Fig. 3) thereby shifting the valve piston 96 to the right and effecting a reverse drive to the spindles. A collar 141 secured to the rod 103 underlies the stud 140 and prevents the forward end of the lever from dropping by gravity.

Hydraulic brake

As hereinbefore stated this invention also provides a hydraulic brake adapted quickly and positively to bring the spindles and their rotating mechanism to rest when the clutch actuating lever L is shifted to its neutral position, thereby to preclude overrunning of the taps.

The construction and control of the hydraulic brake will be clearly understood by referring to Figs. 4, 5, 6, 11 and 12. The brake proper consists merely of a gear pump G actuated from the shaft 23 and adapted during rotation of the taps in either forward or reverse direction to draw in oil from the sump T through a suitable intake port, not shown, and to exhaust it through either the port 142 or 143, dependent whether the tap rotation is in a forward or a reverse direction. During rotation of the taps this flow of oil is continuous and unobstructed and performs no function. Simultaneously with the shifting of the clutch-actuating lever L to its neutral postion, to discontinue rotation of the spindles, a piston valve 144, slidingly fitted in a bore 145 in the casing of the pump G, is moved axially and closes both of the ports 142 and 143 (Fig. 6). Inasmuch as the pump now has an intake but no outlet, fluid pressure will build up in the pump immediately, thereby stopping rotation of the pump gears p and p' and the shaft 23 to which the former is secured. Stopping of the shaft 23 likewise stops the gear 18 thereon and therefore the entire spindle drive is instantaneously but gently brought to rest.

It is of course desirable that the valve 144 be actuated in timed relation with the clutch shifting lever L therefore the two preferably are actuated from the same source. This conveniently may be effected by mechanism now to be described. The valve 144 is connected by a rod 146 to a bar 147 slidingly fitted within a housing 148 supported within the gear-box 5. This bar has secured to it a pin 149 of which one end projects upwardly and enters a cam slot 150 formed in a slide-block 151. This block is slidingly fitted within a channel 152, provided by a subhousing 153, secured upon the housing 148, and formed in its upper wall with a slot 154 (see Fig. 6). The lower end of the pin 149 projects between the adjacent ends of two sleeves 155 and 156 slidingly fitted upon a rod held in the housing 148 parallel to the bar 147. Coil springs 157 and 158 act upon the sleeves 155 and 156 to force them toward each other thereby maintaining them in contact with the pin 149 and yieldingly holding it and the bar 147 in their intermediate positions. This also holds the valve 144 in its intermediate position where it closes both of the outlet ports 142 and 143 of the pump G. The slide-block 151 also has fixed to it an upwardly projecting pin 159 which extends between two collars 160 and 161 (see Fig. 4) secured upon the translatable rod 86 movable with the piston 89. As the rod 86 and block 151 move in the direction indicated by the arrow $j$ (Figs. 4 and 5) by pressure in the outer end of the cylinder 88, the wall 150$^a$ of the cam-slot 150 engages the pin 149 thereby shifting the bar 147, rod 146 and valve 144 to the left until the valve occupies the position shown in Fig. 11. This opens the exhaust port 142 and permits a free flow of oil through the pump during the forward tap rotation. The wall 150$^b$ acts in a reverse manner, when the rod 86 is shifted in the opposite direction to cause the lever L to engage the reverse clutch R, thus shifting the valve to the position shown in Fig. 12, opening the port 143 and permitting a free flow therethrough during the reverse tap drive. From the foregoing it will be perceived that both the clutch actuating lever L and the slide valve 144 are actuated by the axial movement of the rod 86.

The clutches F and R are actuated by a very slight movement of the lever L whereas the valve 144 must receive a substantial axial movement and yet the valve and the clutch must become effective and ineffective at the same time. To provide this unequal motion from a common actuator i. e. the rod 86, the lever L has a lost-motion connection with said rod. This is effected by having a stud 162 on the lever L engaged by either the collar 101 or the collar 161 only after the rod 86 has received a substantial part of its movement which, by that time, has effected substantially all of the movement of the valve 144.

Operation

Pre-supposing that the machine has completed a cycle and has come to rest, the positions of the parts will be as follows:—The tool-head will be in its uppermost position; the pistons of the valves A and B and the control rod 115 will be in their extreme left positions as viewed in Fig. 4, and the clutch actuating lever L will be in its intermediate or neutral position. The position of the valve A is such that pressure is maintained in the cylinder 38 beneath the piston thereby maintaining the head elevated. The valve B is in a position where it connects the pressure line from the pump with the rear end of the cylinder 88 which tends to shift the rod 86 toward the right side of the machine or in the direction of the arrow $j$ in Figs. 4 and 5, however movement of this shaft and the consequent shifting of the lever L to effect a forward drive of the spindles is prevented by the interference block 98 as hereinbefore explained. Also the hydraulic brake will be effective to prevent actuation of the spindle driving mechanism.

Now to effect a subsequent operation, the operator pulls outwardly on the starting lever H which effects rotation of the shaft 54, cocking a load-and-fire device 80—83 and shifting the valve A to the right as viewed in Fig. 4. This movement of the valve connects the pressure line with the upper end of the cylinder 38 thereby effecting a rapid traverse of the tool-head downwardly. Just prior to contact of the taps with the work the final downward movement of the tool-head causes the rods 107 and 103 to be drawn downwardly, swinging the lever 102 about its fulcrum and removing the interference block out of the path of a collar on rod 86. Pressure in the cylinder 88 then shifts the rod 86 in the direction of the arrow $j$ Figs. 4 and 5 and causes the hydraulic brake to be released, lever L to be shifted clockwise, thereby closing clutch F, and effecting a forward drive to the tap spindles which, through a lead-screw, causes the taps to be threaded into the work. Forward rotation of the spindle driving mechanism causes the control rod to be moved to the right until the trip dog 117 thereon shifts the piston of the valve B to the right and causes fluid pressure to be admitted into the inner end of the cylinder 88 which causes the rod 86 and the clutch actuating lever L to be shifted to effect a reverse drive through the clutch R to the tap rotating mechanism. Reverse drive of the taps causes the control rod to be shifted forwardly and after the taps have cleared the work the finger 132 on dog 66, carried by the control rod, releases the load-and-fire mechanism which again shifts the valve A to effect a rapid upward movement of the tool-head. Initial upward movement of the tool-head permits the lever 102 to be shifted about its fulcrum again to put the interference block in the path of the collar 101 on the shaft 86. As the tool-head reaches its uppermost position the dog 116 fixed to the control rod engages the lever 118 of the other load-and-fire mechanism which then shifts the piston of the valve B to the left to again connect the fluid pressure line with the pipe entering the rear end of the cylinder 88. This pressure tends to shift the rod and clutch actuating lever to effect a forward tap drive which however is prevented by the interference block as described, thus again bringing the parts to rest as hereinbefore explained.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed, this invention, I claim as new and desire to secure the following combinations and elements, or equivalents thereof, by Letters Patent of the United States:—

1. A machine tool combining a frame; a tool-head translatably mounted on said frame; a spindle rotatably journaled in said tool-head; means to rotate said spindle; a cylinder; a piston movable in said cylinder; an operative connection between said piston and said tool-head; a fluid pressure supply; two pipes connecting said supply with said cylinder at opposite sides of said piston; a single valve adapted to control the flow of fluid through said pipes; manual means to actuate said valve to effect a flow through one of said pipes to move said piston and tool-head in one direction; and means actuated by the spindle rotating means to cause said valve to effect a flow through the other of said pipes to move said piston and tool-head in the opposite direction.

2. A machine tool combining a frame; a tool-head translatably mounted on said frame; a spindle rotatably journaled in said tool-head; means to rotate said spindle in reverse directions; fluid pressure means to translate said tool-head in reverse directions, said last named means comprising a cylinder, a piston movable in the cylinder; an operative connection between said piston and the tool-head, a fluid pressure line, pipes connected to said pressure line and connected with said cylinder at opposite sides of said piston, and a valve adapted to effect a flow of fluid from said pressure line through either of said pipes; a control bar; means actuated by said spindle rotating means to translate said bar; and a valve-actuating dog carried by said control bar and adapted at a predetermined time to actuate said valve to effect translation of said tool-head.

3. A tapping machine combining a frame; a tool-head translatably mounted on said frame; fluid actuated means for rapidly traversing said head on said frame in opposite directions; a tap spindle rotatably journaled in said tool-head; a tap carried by said spindle; forward and reverse drives for said spindle; a clutch controlling each of said drives; means to render said head traversing means effective to bring the tap adjacent the work; means actuated by the movement of the head to actuate said forward drive clutch to effect a forward tap rotation; a slow tap feed effective during rotation of the tap; automatic means to reverse the direction of rotation of the tap to unscrew it from the work; and automatic means to reverse the action of said fluid actuated head-traversing means to remove the tool-head and tap from the work.

4. In combination with a power transmission; controlling means for said power transmission; a fluid pump actuated by said transmission; an outlet for said pump, said outlet being maintained open during power actuation of said transmission; and means actuated in timed relation with said controlling means to obstruct said outlet when the power is disconnected from said transmission to cause back pressure on said pump and transmission to overcome the momentum thereof.

5. In combination with a power transmission, including a controlling clutch, means to connect and disconnect said clutch, alternately to render said transmission effective and ineffective; a hydraulic brake adapted to act upon said transmission; and means actuated in timed relation with the clutch actuating means to render said brake effective to overcome momentum of said transmission when said clutch is disconnected.

6. In a machine tool, a rotatable member; a forward transmission and a reverse transmission for said member; controlling means for said transmission; a hydraulic brake operatively connected to both of said transmissions and means actuated by said control means to render said brake effective when both of said transmissions are rendered ineffective, thereby to cause a braking action on said transmissions.

7. In a machine tool, a rotatable member; a forward transmission and a reverse transmission for said member; a reservoir; a fluid pump operatively connected to both of said transmissions and serving during the actuation of either of said transmissions to effect a circulation of fluid from said reservoir, through said pump, and back to said reservoir; a valve connected with the outlet of said pump; and means to close said valve when either of said transmissions in rendered ineffective thereby to effect a back-pressure braking action on said pump and the last active transmission.

8. A machine tool combining a rotatable member; forward and reverse drives for said member; a clutch controlling the action of each of said drives; a hydraulic brake adapted at certain times to overcome momentum of either of said drives; a cylinder; a piston movable in said cylinder; a slide-rod connected with said piston; a fluid pressure line; means to admit fluid under pressure from said pressure line into said cylinder at opposite sides of said piston to move said piston and slide-rod in opposite directions; means actuated by the movements of said slide-rod alternately to close and open said forward and reverse drive clutches; and means actuated by the movement of said slide-bar to actuate said hydraulic brake when either of said clutches is opened.

9. A machine tool as specified in claim 8 characterized by this that the hydraulic brake is controlled by a valve actuated by the slide rod and which, when closed, causes the brake to be effective; also that the clutch-actuating means has a lost motion connection with the slide-rod to insure substantial closing of said valve before the then effective clutch starts to be shifted.

10. A machine tool combining a rotatable member; rotating means for said member; a clutch adapted to render said rotating means effective and ineffective; a clutch shifter; fluid pressure means acting upon said shifter and tending to shift said clutch to effective position; interference means to prevent said clutch shifter from moving under the influence of said fluid pressure; and automatic means to render said interference means ineffective at a predetermined point in the cycle of operation of the machine tool.

11. A machine-tool combining a translatable head; a member rotatably journaled in said head; fluid pressure actuated means to translate said head; power means to rotate said member, said means including a clutch; a hydraulic brake adapted to act upon said rotating means to overcome the momentum thereof when the power is disconnected therefrom; a clutch actuator; a brake actuator; and a single fluid pressure actuated member acting upon said actuators simultaneously to render said brake and clutch, respectively, effective and ineffective.

12. A machine tool combining a translatable head; a member rotatably journaled in said head; means to translate said head; a power drive to rotate said member, said power drive including a prime mover, a power transmission from said prime mover to said member and including a clutch adapted to make and break said drive; a clutch shifter; fluid pressure means normally tending to cause said shifter to shift a member of said clutch to driving position; an interference member obstructing the movement of said shifter; and means actuated by the movement of said head to remove said interference member to permit said shifter to render said clutch effective.

13. A machine tool combining a translatable head; a member rotatably journaled therein; power means to translate said head; a power shaft; a forward and a reverse drive from said power shaft to said rotatable member; a friction clutch embodied in each of said drives; a clutch shifter; a slide rod; fluid pressure actuated means adapted to translate said slide rod; means connecting said slide rod with said clutch shifter to actuate the latter by movements of the former; an abutment on said slide-rod; an interference member lying in the path of said abutment and preventing movement of said slide rod; and means actuated by the translation of said head to remove said interference member from the path of said abutment to permit movement of said slide bar and thereby actuation of said clutch shifter and one of said clutches.

14. A machine tool combining a translatable head; a spindle rotatably journaled in said head; power means to translate said head in reverse directions; power means to rotate said spindle in reverse directions; manual means to initiate the movement of said head in one direction; means actuated by the movement of said head to initiate the forward drive of said spindle; means actuated by the spindle forward drive to render said forward drive ineffective and to render effective the spindle reverse drive; and means actuated by the spindle reverse side to effect a reverse translation of said head.

15. A machine tool combining a translatable head; a spindle rotatably journaled in said head; fluid pressure actuated means to translate said head in reverse directions; a spindle forward drive; a spindle reverse drive; fluid pressure actuated means for rendering either of said drives effective; a first valve to control the action of said spindle forward and reverse drives; a second valve to control the direction of translation of said head; manual means to shift said last named valve to effect movement of said head in one direction; means actuated by the movement of said head to render effective the spindle forward drive; a load-and-fire device connected with the first valve; a trip dog shifted by the spindle forward drive and adapted at a predetermined time to actuate said load-and-fire device to cause it to shift said first valve to effect a reverse translation of said head; a trip dog shifted by the spindle reverse drive and adapted to actuate said load-and-fire device to cause it to shift said valve to spindle forward-drive position; and an interference device to prevent said spindle forward drive from acting.

16. A machine tool combining a translatable head; a spindle rotatably journaled in said head; hydraulic means to translate said head in opposite directions; a forward drive for said spindle; a reverse drive for said spindle; hydraulically actuated means to render effective either of said spindle drives; manual means to initiate a forward translation of said head; an automatic control means adapted thereafter to effect successively a spindle forward rotation, a spindle reverse rotation and a reverse translation of the head.

17. A machine tool combining a standard; a tool head translatably mounted on said standard; a spindle rotatably journaled in said tool-head; a gear-box secured upon the upper end of said standard; a power shaft journaled in said gear-box; forward and reverse drives from said shaft to said spindle;

a controlling clutch embodied in each of said drives; fluid pressure actuated means to render effective either of said clutches; fluid pressure actuated means to translate said tool-head in reverse directions; and automatic means to actuate said head translating means and said clutches in a predetermined sequence to effect a complete cycle.

18. A machine tool combining a translatable head; a spindle rotatably journaled in said head; mechanism to rotate said spindle; fluid pressure actuated means to translate said head in reverse directions; a valve controlling the action of said head translating means; manual means to shift said valve to effect translation of said head in one direction; means actuated by the spindle rotating mechanism to render said manual control ineffective during rotation of the spindle; and means also actuated by the spindle rotating mechanism to restore said manual control and to shift said valve to effect translation of said head in the opposite direction.

19. A machine tool combining a frame; a tool-head translatably mounted on said frame; fluid pressure actuated means to translate said head on said frame; a spindle rotatably journaled in said head; a forward transmission for said spindle; means tending to render said transmission effective to rotate said spindle; an interference device acting to maintain said transmission ineffective; and a trip mechanism to neutralize the action of said interference device, thereby to effect rotation of said spindle, said mechanism comprising a slide rod operatively connected with said interference device; an abutment on said slide-rod; and an abutment on said head adapted to engage said first named abutment to move said slide rod and thereby said interference device during translation of said head.

20. A tapping machine combining a translatable head, tap spindles rotatably and translatably journaled in said head; forward and reverse drives for said spindles; a controlling clutch for each of said drives; fluid pressure means to actuate said clutches; a control valve for said fluid pressure means; manual means to shift said valve to initiate a forward drive; a translatable valve control rod; a nut threaded on said rod; means to hold said nut against axial movement; means actuated by said spindle drives for rotating said nut to effect translation of said rod; and a valve trip-dog carried by said control rod and acting, upon a predetermined forward rotation of said spindles, to cause shifting of said valve to render the reverse drive effective.

21. In a machine tool, in combination; a rotatable member; a forward and a reverse drive for said member; a clutch controlling the action of each of said drives; a hydraulic brake common to both of said drives; a clutch actuator common to both of said clutches; and fluid pressure actuated means for shifting said clutch actuator to discontinue one of said drives and substantially simultaneously therewith actuating said brake to overcome the momentum in the discontinued drive.

22. A machine tool combining a translatable member; fluid pressure means for translating said member; a valve for controlling the action of said fluid pressure means; a manually rotatable shaft; an operative connection between said shaft and said valve whereby rotation of said shaft actuates said valve to initiate a movement of said member from its position of rest; means rendered effective after said valve has been actuated to render inoperative said operative connection; and means to restore said operative connection when the member has been returned to its position of rest.

In witness whereof, I have hereunto subscribed my name.

ROBERT M. GALLOWAY.